US012043979B2

(12) United States Patent
White

(10) Patent No.: US 12,043,979 B2
(45) Date of Patent: Jul. 23, 2024

(54) APPARATUS FOR INSERTING AN ELONGATE OBJECT INTO A TRENCH

(71) Applicant: Soil Machine Dynamics Limited, Wallsend (GB)

(72) Inventor: Roger Paul White, Wallsend (GB)

(73) Assignee: Soil Machine Dynamics Limited, Wallsend (GB)

( * ) Notice: Subject to any disclaimer, the term of this patent is extended or adjusted under 35 U.S.C. 154(b) by 0 days.

(21) Appl. No.: 17/850,844

(22) Filed: Jun. 27, 2022

(65) Prior Publication Data
US 2022/0412046 A1 Dec. 29, 2022

(30) Foreign Application Priority Data

Jun. 28, 2021 (EP) ..................................... 21182054
Sep. 9, 2021 (GB) ..................................... 2112876

(51) Int. Cl.
*E02F 5/10* (2006.01)
*E02F 5/14* (2006.01)

(52) U.S. Cl.
CPC .............. *E02F 5/107* (2013.01); *E02F 5/106* (2013.01); *E02F 5/14* (2013.01)

(58) Field of Classification Search
CPC . E02F 5/106; E02F 5/145; E02F 9/205; E02F 5/14; E02F 5/104; E02F 5/027; E02F 5/10; E02F 5/02; H02G 1/10; H02G 1/06
See application file for complete search history.

(56) References Cited

U.S. PATENT DOCUMENTS 2,048,710 A * 7/1936 Ranney ................... E21B 7/003
37/351
2,136,911 A * 11/1938 Briscoe ................... E02F 5/027
37/372
(Continued)

FOREIGN PATENT DOCUMENTS

CN 105202263 A 12/2015
DE 19542689 C1 4/1997
(Continued)

OTHER PUBLICATIONS

European Patent Office, Extended Search Report, Application No. 19213813.9, May 18, 2020, 9 pages.
(Continued)

*Primary Examiner* — Edwin J Toledo-Duran
(74) *Attorney, Agent, or Firm* — Reinhart Boerner Van Deuren s.c.

(57) ABSTRACT

A plough for inserting a cable into a trench in the seabed is disclosed. The plough comprises a plough share for forming a trench in the seabed and a drawbar for enabling attachment of tensile members to the plough. The drawbar is moveable relative to the plough share between a first position, in which the plough is adapted to be towed by a towing cable to move the plough share relative to the seabed to form a trench, and a second position, in which the plough is adapted to be supported by the towing cable to enable the plough apparatus to be deployed to the seabed. A cable path receives the cable and an attachment part of the drawbar is moveable relative to the plough share between the second position and a third position, to enable the cable to be received in the cable path from above the plough.

21 Claims, 16 Drawing Sheets

(56) References Cited

U.S. PATENT DOCUMENTS

| | | | | |
|---|---|---|---|---|
| RE20,990 E * | 1/1939 | Wright | ............ | E02F 5/027 37/366 |
| 2,849,809 A * | 9/1958 | Chattin | ............ | E02F 3/7663 37/372 |
| 3,238,734 A * | 3/1966 | Rhodes | ............ | E02F 5/107 37/332 |
| 3,333,432 A * | 8/1967 | Hale | ............ | E02F 5/107 405/164 |
| 3,434,297 A * | 3/1969 | Spollen | ............ | E02F 5/105 405/160 |
| 3,462,963 A * | 8/1969 | Moore | ............ | E02F 5/104 405/164 |
| 3,504,504 A * | 4/1970 | Elliott | ............ | E02F 5/106 405/163 |
| 3,526,047 A * | 9/1970 | Goltz | ............ | E02F 9/085 280/43.23 |
| 3,590,589 A * | 7/1971 | Smulders | ............ | E02F 5/105 405/161 |
| 3,627,372 A * | 12/1971 | Carpenter | ............ | E02F 3/3681 294/198 |
| 3,670,514 A * | 6/1972 | Breston | ............ | E02F 5/109 405/160 |
| 3,722,224 A * | 3/1973 | Roy | ............ | E02F 5/104 405/163 |
| 3,751,927 A * | 8/1973 | Perot, Jr. | ............ | E02F 5/107 405/162 |
| 3,877,237 A * | 4/1975 | Norman | ............ | E02F 5/105 405/160 |
| 3,897,639 A * | 8/1975 | Hansen | ............ | E02F 9/06 37/313 |
| 3,990,377 A * | 11/1976 | Marquinez | ............ | H04B 5/266 405/161 |
| 4,022,028 A * | 5/1977 | Martin | ............ | E02F 3/9206 37/330 |
| 4,037,422 A * | 7/1977 | DeBoer | ............ | E02F 5/107 405/160 |
| 4,039,087 A * | 8/1977 | Sandvick, Sr. | ............ | F16L 1/09 29/237 |
| 4,091,629 A * | 5/1978 | Gunn | ............ | E02F 5/106 405/181 |
| 4,124,991 A * | 11/1978 | Adler | ............ | F16L 1/18 405/166 |
| 4,129,992 A * | 12/1978 | Carlsson | ............ | H02G 1/10 405/164 |
| 4,149,326 A * | 4/1979 | Rosa | ............ | E02F 5/108 405/160 |
| 4,218,158 A * | 8/1980 | Tesson | ............ | F16L 1/26 405/158 |
| 4,268,189 A * | 5/1981 | Good | ............ | F16L 1/06 405/172 |
| 4,268,190 A * | 5/1981 | Tesson | ............ | F16L 1/26 405/184.5 |
| 4,274,760 A * | 6/1981 | Norman | ............ | E02F 5/105 405/160 |
| 4,295,757 A * | 10/1981 | Gaspar | ............ | E02F 5/107 405/164 |
| 4,301,606 A * | 11/1981 | Hofmeester | ............ | E02F 5/108 37/329 |
| 4,362,436 A * | 12/1982 | Harmstorf | ............ | E02F 5/109 405/164 |
| 4,410,297 A * | 10/1983 | Lynch | ............ | E02F 5/104 405/181 |
| 4,465,400 A * | 8/1984 | Adams | ............ | F16L 1/161 405/169 |
| 4,470,720 A * | 9/1984 | Lennard | ............ | E02F 5/108 405/164 |
| 4,585,372 A * | 4/1986 | Grinstead | ............ | E02F 5/106 405/174 |
| 4,586,850 A * | 5/1986 | Norman | ............ | E02F 5/105 405/160 |
| 4,714,378 A * | 12/1987 | Lincoln | ............ | E02F 5/104 405/161 |
| 4,714,379 A * | 12/1987 | Gilchrist, Jr. | ............ | E02F 5/06 405/166 |
| 4,721,409 A * | 1/1988 | Harmstorf | ............ | E02F 3/10 405/163 |
| 4,749,308 A * | 6/1988 | Izawa | ............ | E02F 3/8858 405/161 |
| 4,802,793 A * | 2/1989 | Grinsted | ............ | H02G 1/10 405/164 |
| 4,812,079 A * | 3/1989 | Johnson | ............ | E02F 5/104 405/164 |
| 4,877,355 A * | 10/1989 | Van Pelt | ............ | E02F 5/107 405/158 |
| 4,896,998 A * | 1/1990 | Reece | ............ | F16L 1/12 405/160 |
| 4,992,000 A * | 2/1991 | Doleshal | ............ | E02F 5/108 405/164 |
| 5,349,765 A * | 9/1994 | Kitanaka | ............ | E02F 3/142 37/356 |
| 5,626,438 A * | 5/1997 | Etheridge | ............ | E02F 5/104 15/104.04 |
| 5,659,983 A * | 8/1997 | Coutarel | ............ | E02F 5/12 405/163 |
| 5,722,793 A * | 3/1998 | Peterson | ............ | B63B 35/06 405/164 |
| 5,795,101 A * | 8/1998 | Bill | ............ | F16L 1/06 405/184.5 |
| 6,189,244 B1 * | 2/2001 | Johnson | ............ | E02F 5/14 405/181 |
| 6,273,642 B1 * | 8/2001 | Anderson | ............ | E02F 5/105 405/163 |
| 6,705,029 B2 * | 3/2004 | Anderson | ............ | E02F 5/14 405/160 |
| 6,719,494 B1 * | 4/2004 | Machin | ............ | E02F 5/107 405/160 |
| 6,837,653 B1 * | 1/2005 | Grinsted | ............ | E02F 5/145 405/164 |
| 8,939,678 B2 | 1/2015 | Lazzarin et al. | | |
| 9,605,407 B2 * | 3/2017 | Penner | ............ | E02F 5/027 |
| 10,323,383 B2 | 6/2019 | Wilson | | |
| 10,711,432 B2 * | 7/2020 | White | ............ | E02F 5/14 |
| 10,947,695 B2 | 3/2021 | Lu et al. | | |
| 11,466,425 B2 * | 10/2022 | Alumbaugh | ............ | A01B 31/00 |
| 11,613,870 B2 * | 3/2023 | Walker | ............ | E02F 5/109 405/159 |
| 2002/0017041 A1 * | 2/2002 | Gloppen | ............ | E02F 5/006 37/344 |
| 2003/0201011 A1 * | 10/2003 | Beals | ............ | F16K 7/06 137/15.08 |
| 2007/0253780 A1 * | 11/2007 | Pihl | ............ | E02F 5/109 405/184 |
| 2010/0095560 A1 * | 4/2010 | Grinsted | ............ | E02F 5/104 37/352 |
| 2011/0211913 A1 * | 9/2011 | Lazzarin | ............ | E02F 5/109 405/163 |
| 2012/0114420 A1 * | 5/2012 | Lazzarin | ............ | F16L 1/163 405/171 |
| 2013/0115006 A1 | 5/2013 | Oldervoll | | |
| 2014/0150303 A1 * | 6/2014 | Wilson | ............ | E02F 5/125 37/342 |
| 2014/0154014 A1 * | 6/2014 | Wilson | ............ | E02F 5/106 172/430 |
| 2014/0283421 A1 * | 9/2014 | Manchester | ............ | E02F 5/104 37/309 |
| 2014/0345171 A1 * | 11/2014 | Manchester | ............ | E02F 5/06 37/352 |
| 2015/0110563 A1 * | 4/2015 | Manchester | ............ | B66C 3/20 405/184.4 |
| 2016/0215476 A1 * | 7/2016 | Walker | ............ | E21B 41/04 |
| 2018/0216314 A1 * | 8/2018 | Bonel | ............ | E02F 5/145 |
| 2020/0165796 A1 * | 5/2020 | Manchester | ............ | E02F 3/9218 |
| 2020/0318314 A1 * | 10/2020 | Lu | ............ | E02F 5/107 |
| 2021/0010230 A1 * | 1/2021 | Haddorp | ............ | E02F 3/8858 |

(56) References Cited

U.S. PATENT DOCUMENTS

| | | | | |
|---|---|---|---|---|
| 2021/0292995 | A1* | 9/2021 | Walker | E02F 5/106 |
| 2022/0352699 | A1* | 11/2022 | Walker | H02G 9/02 |

FOREIGN PATENT DOCUMENTS

| | | | | |
|---|---|---|---|---|
| EP | 0296783 | A1 | 12/1988 | |
| EP | 0543467 | A1 | 5/1993 | |
| EP | 2787126 | A1 | 10/2014 | |
| EP | 2840187 | A1 | 2/2015 | |
| EP | 3121917 | A1 | 1/2017 | |
| EP | 3499662 | A1 | 6/2019 | |
| EP | 4047141 | A1 | 8/2022 | |
| GB | 2049094 | A | 12/1980 | |
| GB | 2172032 | A | 9/1986 | |
| GB | 2212536 | A | 7/1989 | |
| GB | 2355276 | A | 4/2001 | |
| GB | 2545925 | A * | 7/2017 | E02F 5/104 |
| GB | 2545925 | A | 7/2017 | |
| KR | 20120065024 | A | 6/2012 | |
| NL | 2024240 | B1 | 7/2021 | |
| RU | 2010139625 | A | 4/2012 | |
| WO | 9954556 | A1 | 10/1999 | |
| WO | 0149947 | A1 | 7/2001 | |
| WO | 0175236 | A1 | 10/2001 | |
| WO | 2009141409 | A2 | 11/2009 | |
| WO | 2012007790 | A1 | 1/2012 | |
| WO | 2013167910 | A1 | 11/2013 | |
| WO | 2014161984 | A1 | 10/2014 | |
| WO | 2015032730 | A1 | 3/2015 | |
| WO | 2017017599 | A1 | 2/2017 | |
| WO | 2021094193 | A1 | 5/2021 | |
| WO | WO-2021094193 | A1 * | 5/2021 | E02F 5/106 |

OTHER PUBLICATIONS

European Patent Office, Extended Search Report, Application No. 20164557.9, Nov. 19, 2020, 12 pages.
European Patent Office, Extended Search Report, Application No. 21182054.3, Dec. 22, 2021, 7 pages.
Danish Patent and Trademark Office, Search Report and Opinion, Application No. PA201870577, Jul. 12, 2019, 9 pages.
PCT International Search Report and Written Opinion, PCT/EP2017/054300, May 11, 2017, 12 pages.
PCT International Search Report and Written Opinion, PCT/EP2020/075803, Feb. 23, 2021, 14 pages.
European Patent Office, Partial Search Report, Application No. 22181186.2, Nov. 21, 2022, 13 pages.
European Patent Office, Extended Search Report, Application No. 22181186.2, Feb. 27, 2023, 12 pages.
European Patent Office, Third Party Observations, dated Jun. 18, 2024, 8 pages.
"Development of Submarine Cable Plough Plough Burial of Fibre Optic Submarine Cables," Jönsson et al., Teleteknik 1986, vol. 1, English Edition.

* cited by examiner

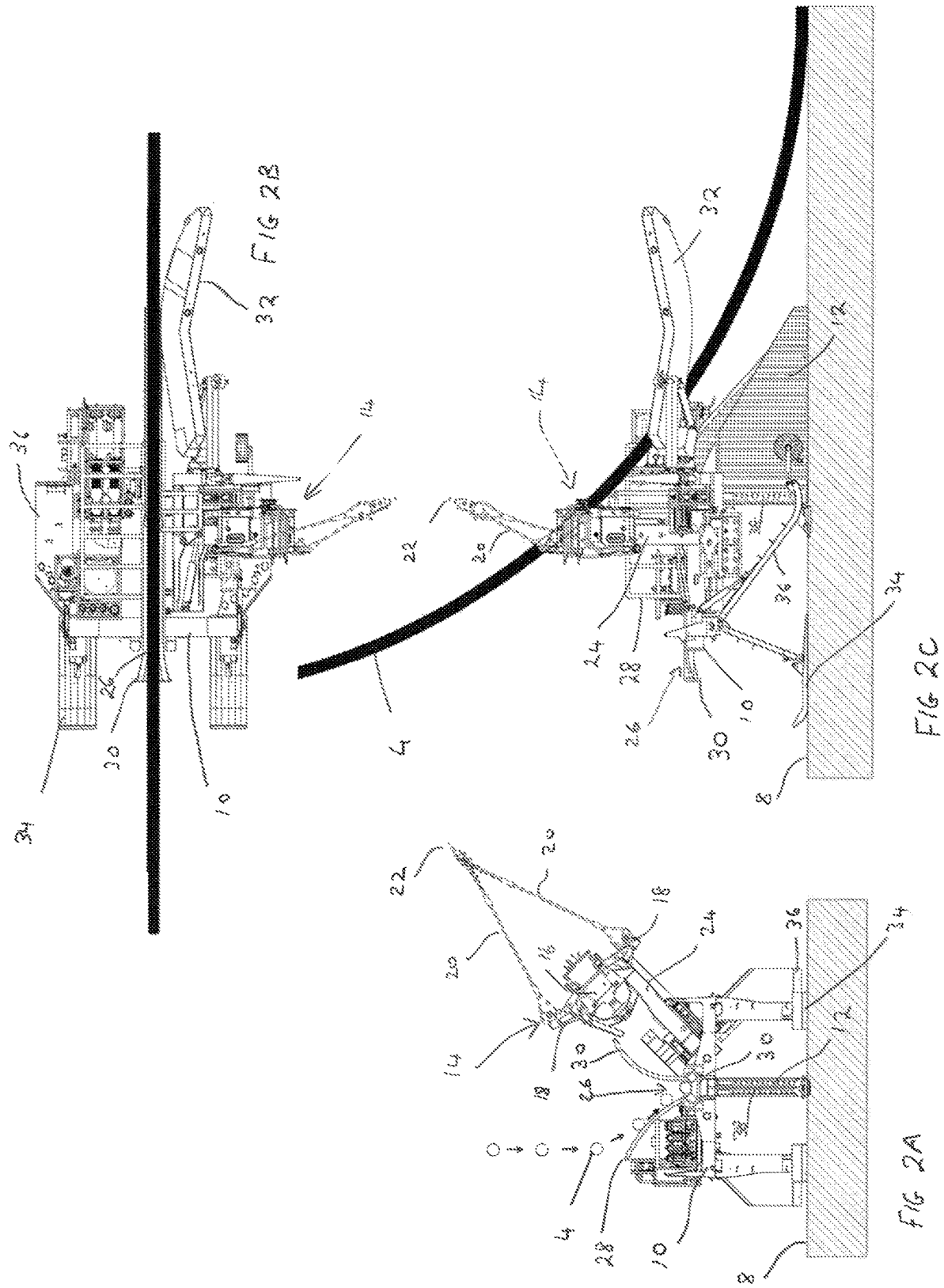

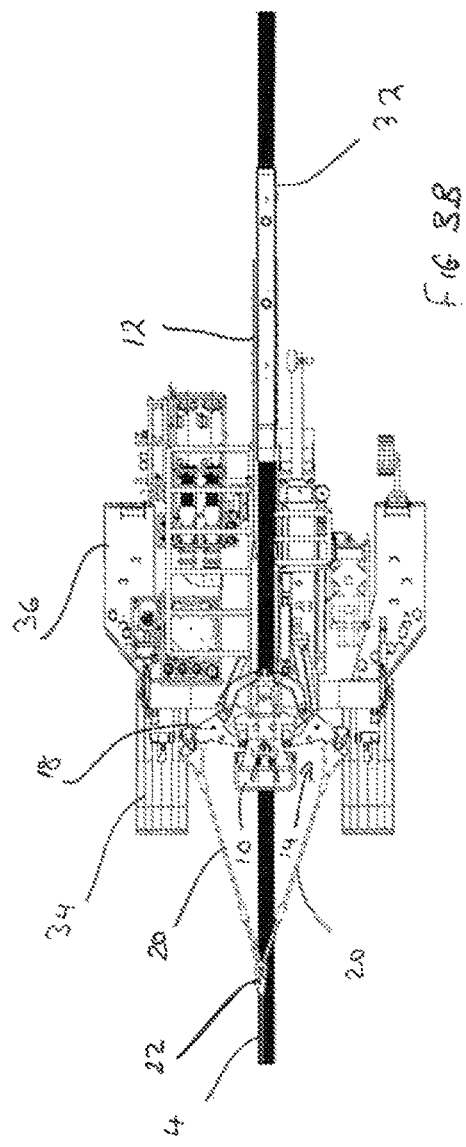
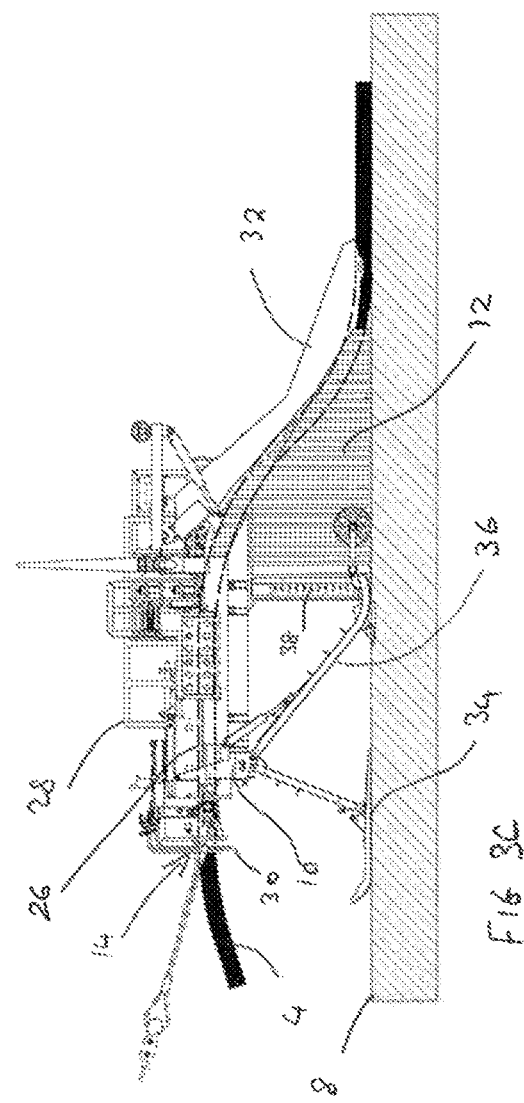
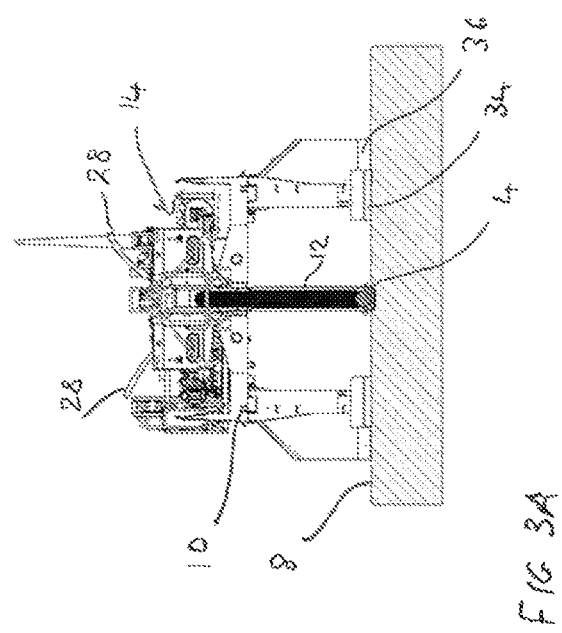
FIG 3B
FIG 3C
FIG 3A

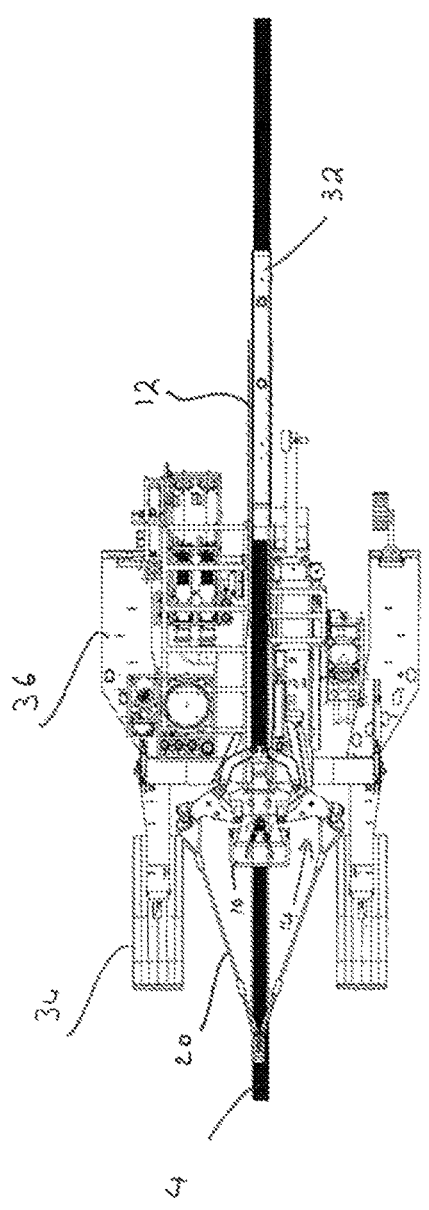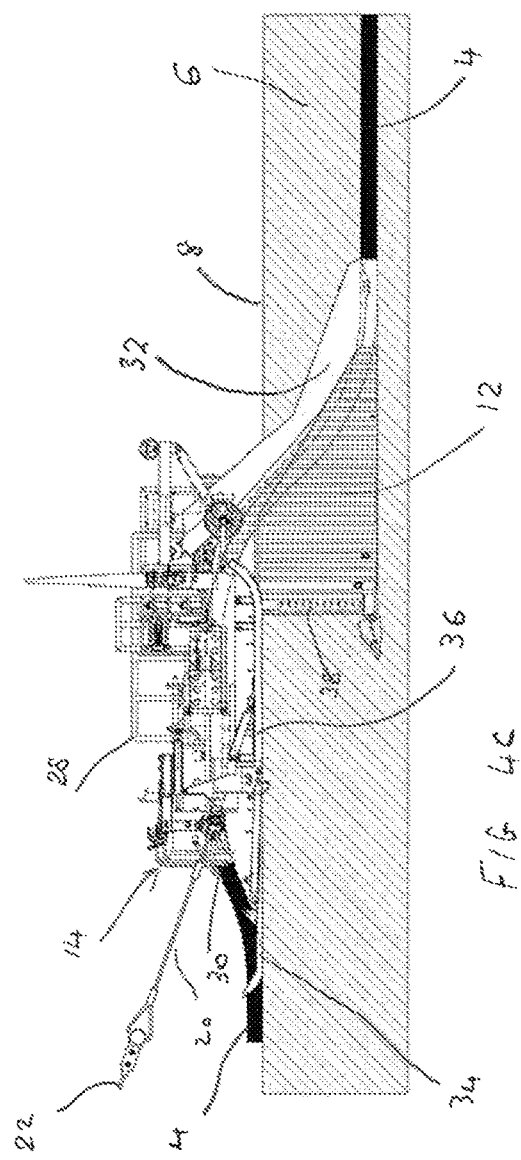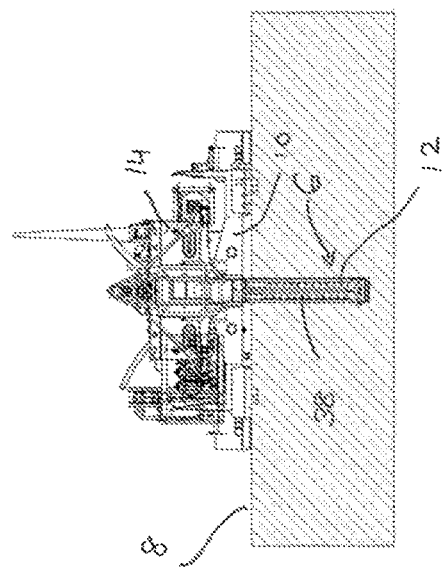

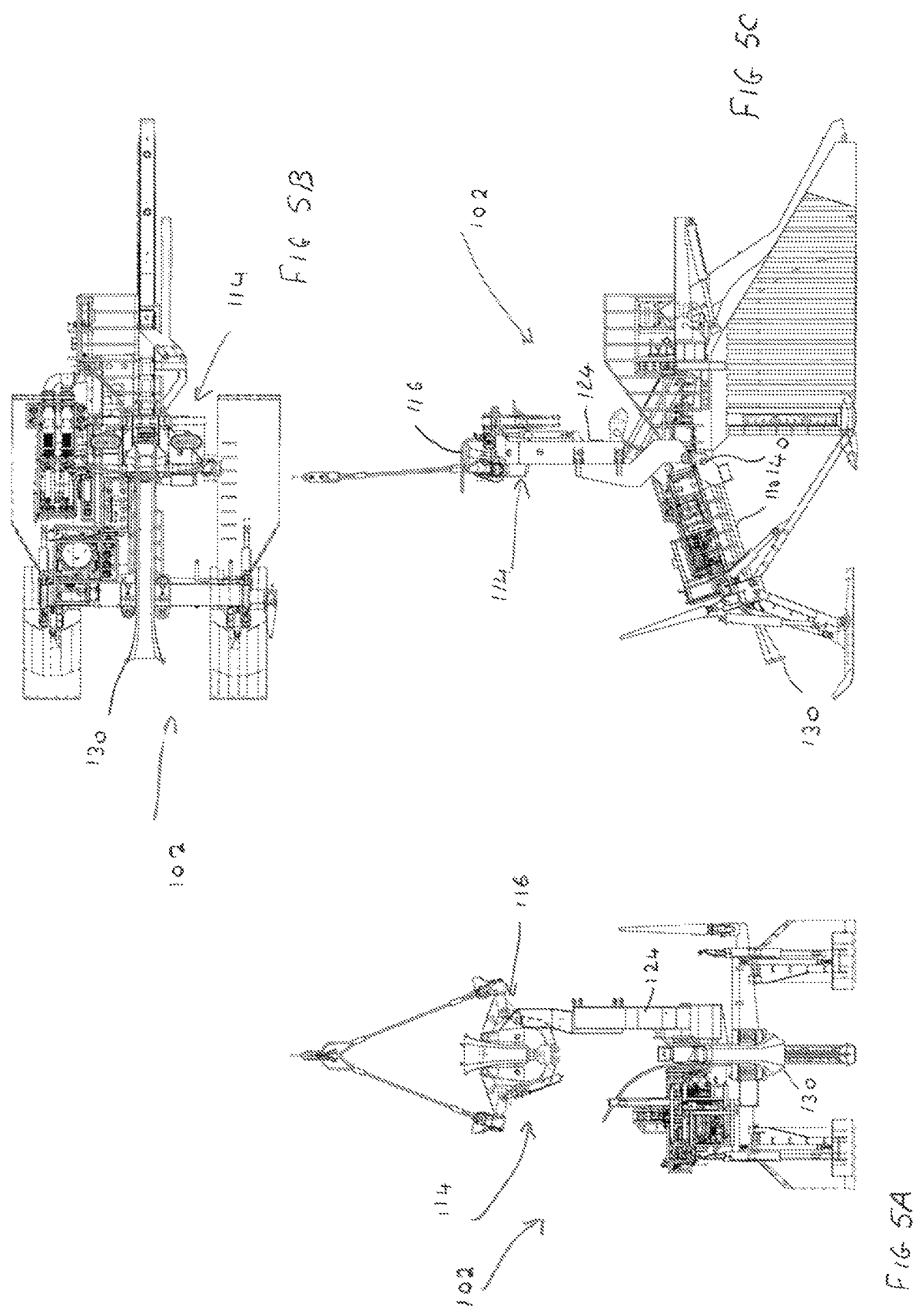

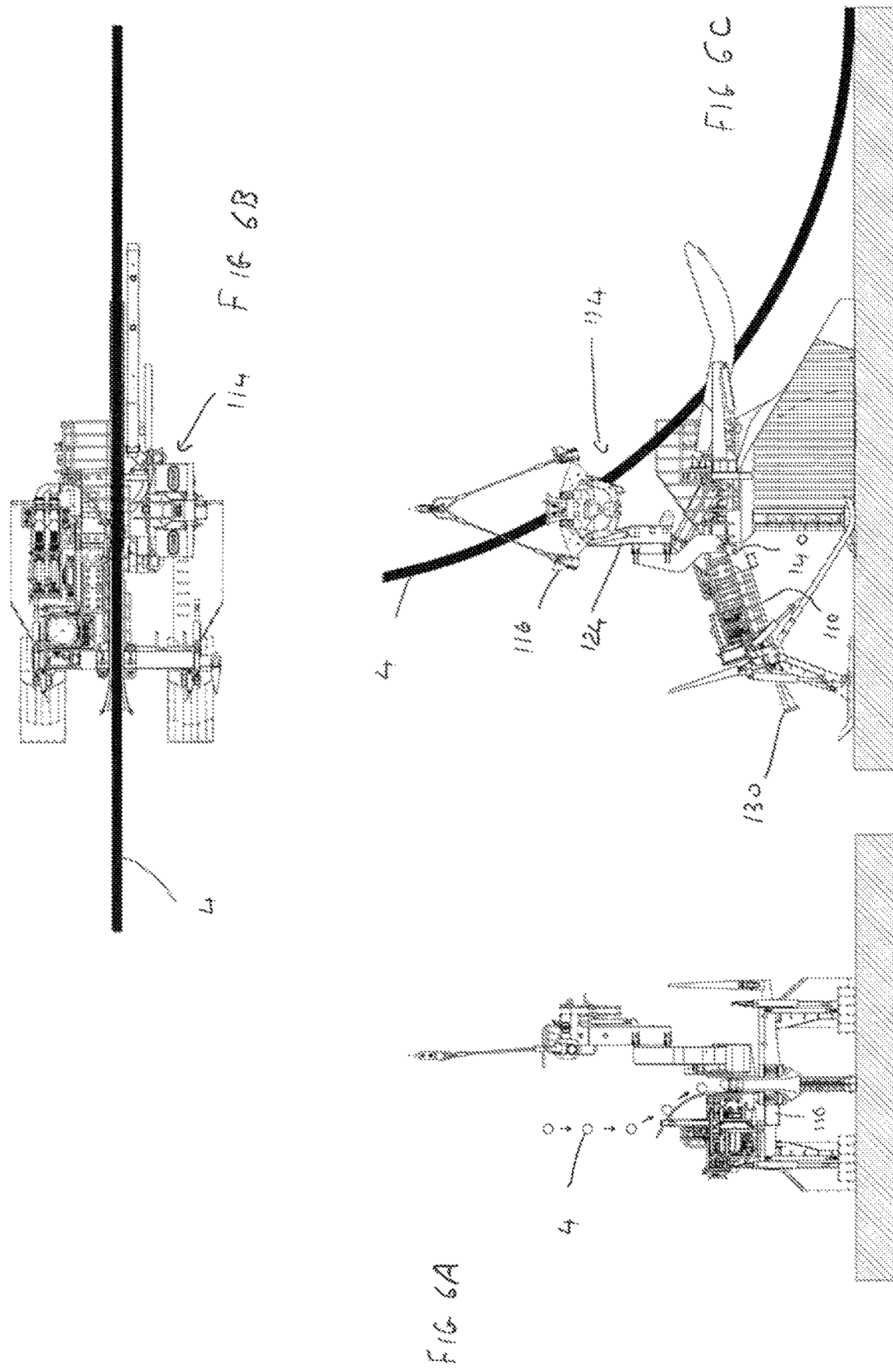

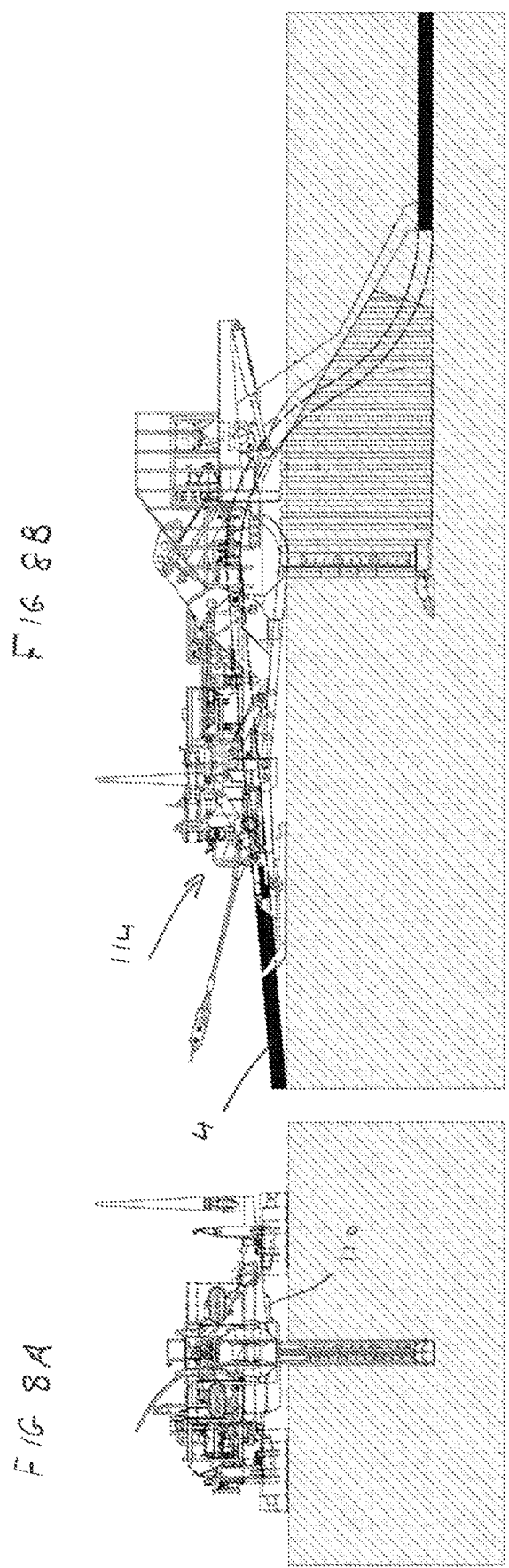

LIFTING

LOADING
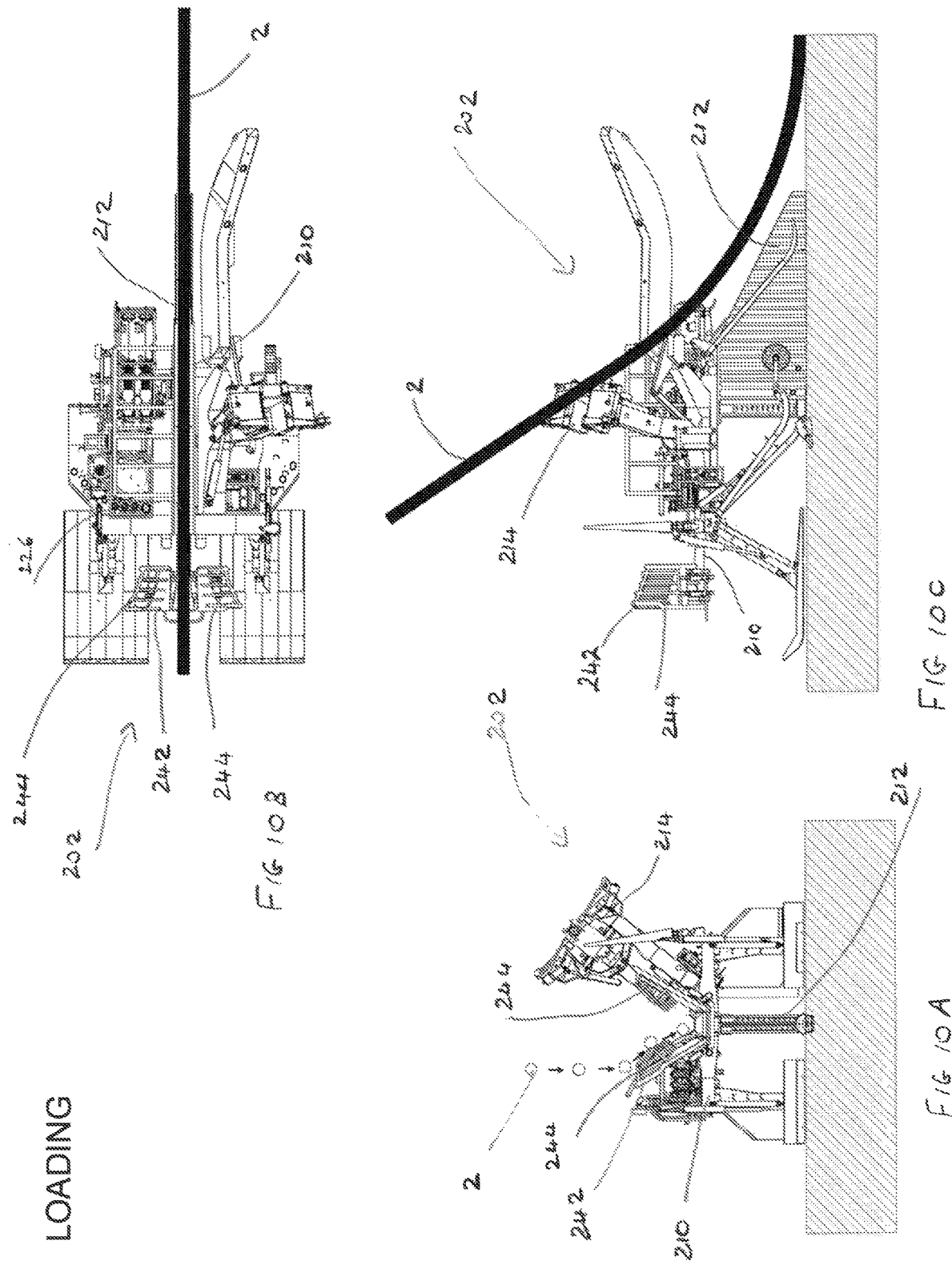

CABLE LOADED

FULL DEPTH PLOUGHING

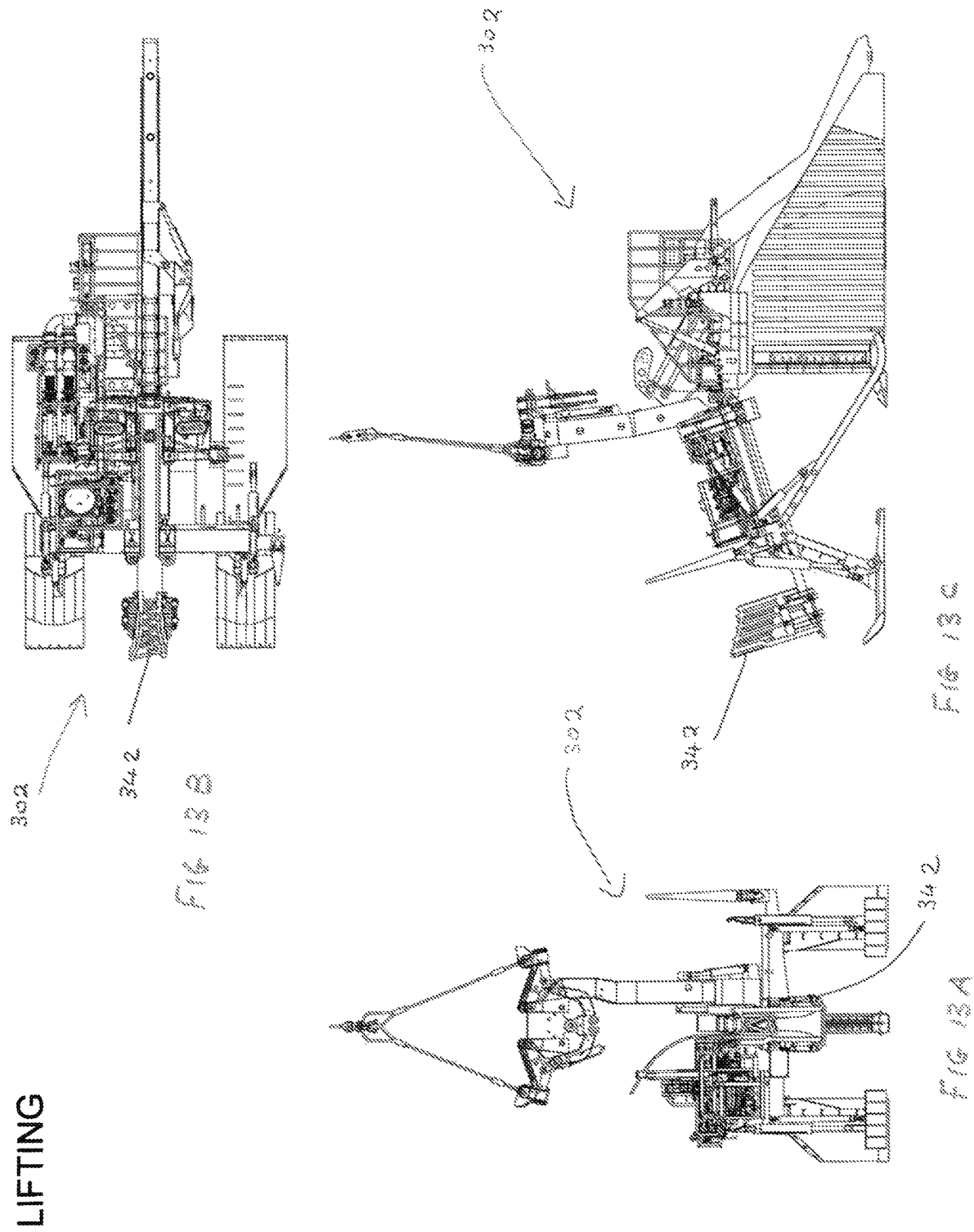

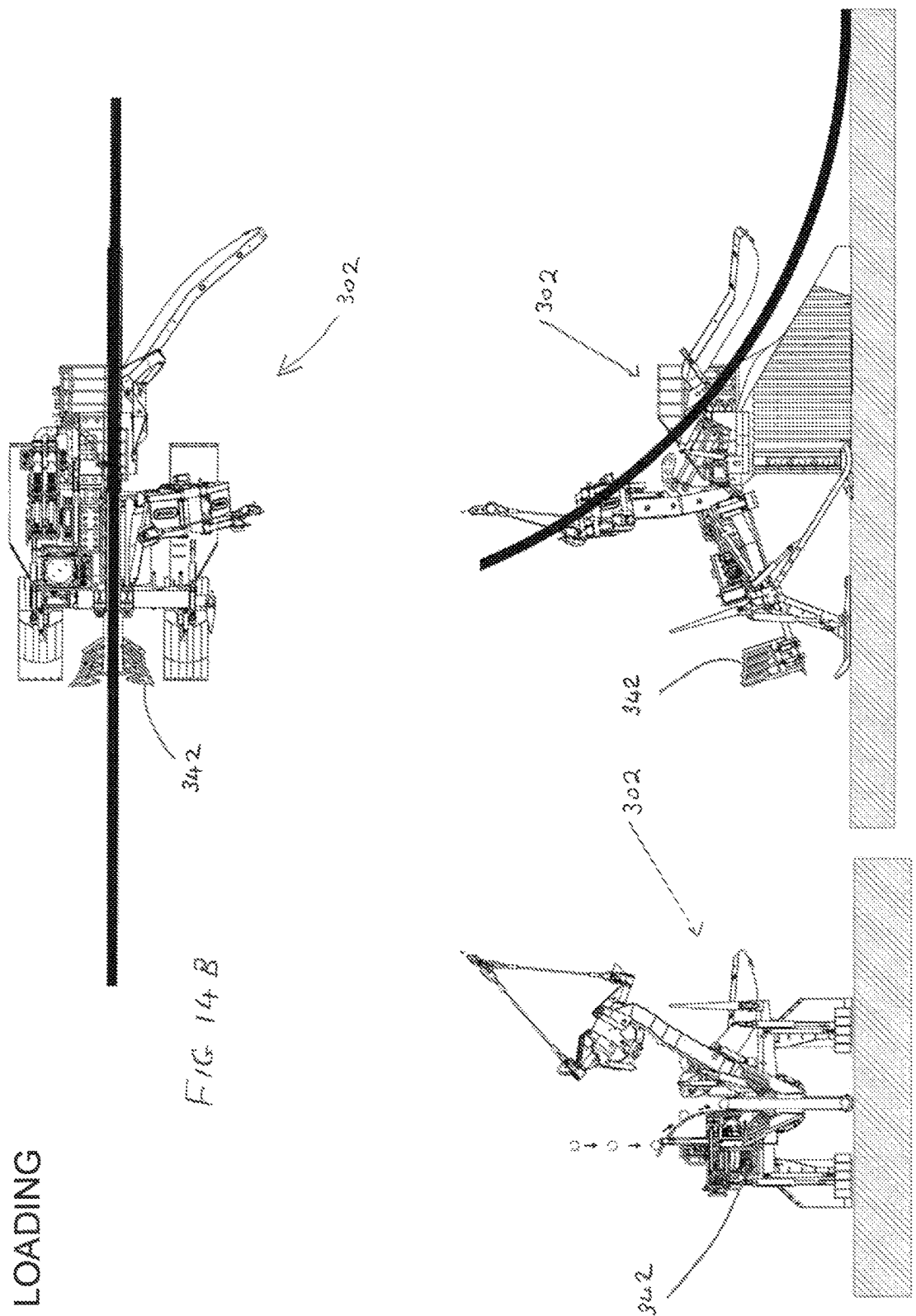

CABLE LOADED

FULL DEPTH PLOUGHING

APPARATUS FOR INSERTING AN ELONGATE OBJECT INTO A TRENCH

CROSS-REFERENCE TO RELATED APPLICATIONS

This application claims priority to European Patent Application No. 21182054.3 filed Jun. 28, 2021, and United Kingdom Patent Application No. 2112876.4 filed Sep. 9, 2021, the disclosures of which are incorporated herein by reference in their entireties and for all purposes.

STATEMENT CONCERNING FEDERALLY SPONSORED RESEARCH OR DEVELOPMENT

Not applicable.

FIELD OF THE INVENTION

The present disclosure relates to an apparatus for inserting an elongate object into a trench in a floor in a of body of water and relates to particularly, but not exclusively, to an apparatus for inserting a cable into a trench in the seabed.

BACKGROUND OF THE INVENTION

Apparatus are known for burying cables in the seabed, and consist of a plough having a plough share which forms a trench in the seabed into which the cable is inserted by the plough. However, such ploughs involve loading the cable into the plough by means of a crane manipulator having a cable grab, and a tipping cable trough for manipulating the cable into the plough. Such arrangements suffer from the drawback that in the case of delicate cables, such as lead-lined cables, there is a risk of damage to the cable.

SUMMARY OF THE INVENTION

According to an aspect of the present disclosure, there is provided an apparatus for inserting an elongate object into a trench in a floor in a body of water, the apparatus comprising: —
  trench-forming means for forming a trench in a floor of a body of water;
  attachment means for enabling attachment of at least one tensile member to the apparatus, wherein the attachment means is moveable relative to the trench-forming means between a first position, in which the apparatus is adapted to be towed by at least one said tensile member to move the trench-forming means relative to the floor of the body of water to form a trench therein, and a second position, in which the apparatus is adapted to be supported by at least one said tensile member to enable the apparatus to be deployed to the floor of the body of water; and
  receiving means for receiving at least part of an elongate object to be inserted into the trench;
  wherein the attachment means is moveable relative to the trench-forming means between the second position and a third position, to enable at least part of the elongate object to be received in the receiving means from a side of the apparatus remote from the trench-forming means.

By providing attachment means moveable relative to the trench-forming means between the second position and a third position, to enable at least part of the elongate object to be received in the receiving means from a side of the apparatus remote from the trench-forming means, this provides the advantage of reducing the risk of damage to the elongate object, by avoiding the need to manipulate the elongate object with cable grabs, and reducing the time taken to load the elongate object into the apparatus, since the elongate object can be loaded into the apparatus from above.

The attachment means may be adapted to be attached to each of a plurality of tensile members at a respective location, and the position of at least one said location may be adjustable relative to the trench-forming means.

This provides the advantage of enabling an effective hitch point of the apparatus to be adjusted, as a result of which the apparatus can be steered by means of a single cable attached to a plurality of said tensile members.

The attachment means may be pivotable between the first and second positions. This provides the advantage of enabling easy movement of the attachment means between the first and second positions by means of actuators.

The attachment means may be pivotable between the second and third positions.

The apparatus may further comprise urging means for urging the elongate object into the trench formed by the trench-forming means.

The urging means may be moveable between a fourth position in which the urging means is adapted to urge the elongate object into the trench formed by the trench-forming means, and a fifth position to enable at least part of the elongate object to be received in the receiving means from a side of the apparatus remote from the trench-forming means.

Movement of the attachments means from the second position to the third position may cause movement of the urging means from the fourth position to the fifth position.

This provides the advantage of simplifying the construction of the apparatus.

The apparatus may further comprise guide means for guiding the elongate object into the receiving means.

This provides the advantage of reducing the risk of damage to the elongate object.

The trench-forming means may further comprise a plurality of nozzles for emitting water jets.

A plurality of said nozzles may be selectively operable.

This provides the advantage of improving efficiency of operation of jetting.

The apparatus may further comprise floor engaging means for engaging the floor of the body of water.

The floor engaging means may comprise a plurality of first floor engaging members for engaging the floor of the body of water forwards of the trench-forming means.

The floor-engaging means may further comprise second floor engaging members for engaging the floor of the body of water rearwardly of the first floor engaging means.

This provides the advantage of enabling sinking of the trench-forming means into a soft floor of the body of water to be controlled, and stability in deployment and recovery of the apparatus from the floor of a body of water to be improved.

The position of the floor engaging means relative to the trench-forming means may be adjustable.

The apparatus may further comprise bend limiting means for limiting bending of the elongate object at an inlet to the receiving means.

This provides the advantage of further reducing the risk of damage to the elongate object by preventing bending of the elongate object around a bend radius less than a predetermined value.

The height of an inlet to the bend limiting means may be adjustable relative to the trench-forming means.

This provides the advantage of enabling greater trench depths, because the entry height of the elongate object to the bend limiting means can be minimised during shallow trenching or when transitioning to and from full depth.

The apparatus may further comprise retaining means mounted to the body forwards of the trench forming means and having a released condition, enabling insertion of an elongate object into the retaining means from a side of the body remote from the trench forming means, and a retaining condition, for retaining an elongate object in the retaining means.

The retaining means may be adapted to prevent the attachment means from coming into contact with an elongate object retained in said retaining means in a retaining condition thereof.

The retaining means may comprise at least one retaining member mounted to the body and moveable between released and retaining conditions thereof.

At least one said retaining member may be pivotably moveable between released and retaining conditions thereof.

According to another aspect of the present disclosure, there is provided an apparatus for inserting an elongate object into a trench in a floor in a body of water, the apparatus comprising:—
  a body;
  trench-forming means mounted to the body for forming a trench in a floor of a body of water;
  receiving means for receiving at least part of an elongate object to be inserted into the trench from a side of the body remote from the trench-forming means; and
  retaining means mounted to the body forwards of the trench forming means and having a released condition, enabling insertion of an elongate object into the retaining means from a side of the body remote from the trench forming means, and a retaining condition, for retaining an elongate object in the retaining means.

By providing retaining means mounted to the body forwards of the trench forming means and having a released condition, enabling insertion of an elongate object into the retaining means from a side of the body remote from the trench forming means, and a retaining condition, for retaining an elongate object in the retaining means, this provides the advantage of minimising the risk of damage to the elongate object, for example when moving an attachment means relative to the trench-forming means between its second position and its third position.

The retaining means may comprise at least one retaining member mounted to the body and moveable between released and retaining conditions thereof.

At least one said retaining member may be pivotably moveable between released and retaining conditions thereof.

The apparatus may further comprise attachment means for enabling attachment of at least one tensile member to the apparatus, wherein the attachment means is moveable relative to the trench-forming means between a first position, in which the apparatus is adapted to be towed by at least one said tensile member to move the trench-forming means relative to the floor of the body of water to form a trench therein, and a second position, in which the apparatus is adapted to be supported by at least one said tensile member to enable the apparatus to be deployed to the floor of the body of water; and
  receiving means for receiving at least part of an elongate object to be inserted into the trench;
  wherein the attachment means is moveable relative to the trench-forming means between the second position and a third position, to enable at least part of the elongate object to be received in the receiving means from a side of the apparatus remote from the trench-forming means.

The retaining means may be adapted to prevent the attachment means from coming into contact with an elongate object retained in said retaining means in a retaining condition thereof.

The attachment means may be adapted to be attached to each of a plurality of tensile members at a respective location, and the position of at least one said location is adjustable relative to the trench-forming means.

The attachment means may be pivotable between the first and second positions.

The attachment means may be pivotable between the second and third positions.

The apparatus may further comprise urging means for urging the elongate object into the trench formed by the trench-forming means.

The urging means may be moveable between a fourth position in which the urging means is adapted to urge the elongate object into the trench formed by the trench-forming means, and a fifth position to enable at least part of the elongate object to be received in the receiving means from a side of the apparatus remote from the trench-forming means.

Movement of the attachments means from the second position to the third position may cause movement of the urging means from the fourth position to the fifth position.

The apparatus may further comprise guide means for guiding the elongate object into the receiving means.

The trench-forming means may further comprise a plurality of nozzles for emitting water jets.

A plurality of said nozzles may be selectively operable.

The apparatus may further comprise floor engaging means for engaging the floor of the body of water.

The floor engaging means may comprise a plurality of first floor engaging members for engaging the floor of the body of water forwards of the trench-forming means.

The floor-engaging means may further comprise second floor engaging members for engaging the floor of the body of water rearwardly of the first floor engaging means.

The position of the floor engaging means relative to the trench-forming means may be adjustable.

The apparatus may further comprise bend limiting means for limiting bending of the elongate object at an inlet to the receiving means.

A height of an inlet to the bend limiting means may be adjustable relative to the trench-forming means.

BRIEF DESCRIPTION OF THE DRAWINGS

Preferred embodiments of the disclosure will now be described, by way of example only and not in any limitative sense, with reference to the accompanying drawings, in which:

FIGS. 2A to 2C show respectively a front, top and side view of the plough of FIG. 1 in a loading mode with a cable being loaded into the plough;

FIGS. 3A to 3C show respectively a front, top and side view of the plough of FIG. 1 in a ploughing mode with the cable loaded into the plough;

FIGS. 4A to 4C show the plough of FIG. 3 in its full depth ploughing condition;

FIGS. 5A to 5C show respectively a front, top and side view of a plough of a second embodiment in a lifting mode;

FIGS. 6A to 6C show respectively a front, top and side view of the plough of FIG. 5 in a loading mode with a cable being loaded into the plough;

FIGS. 8A and 8B show the plough of FIG. 7 in its full depth ploughing condition;

FIGS. 10A to 10C show respectively a front, top and side view of the plough of FIG. 9 in a loading mode with a cable being loaded into the plough;

FIGS. 13A to 13C show respectively a front, top and side view of a plough of a fourth embodiment in a lifting mode;

FIGS. 14A to 14C show respectively a front, top and side view of the plough of FIG. 13 in a loading mode with a cable being loaded into the plough;

DETAILED DESCRIPTION OF THE PREFERRED EMBODIMENT

Figure 1B:
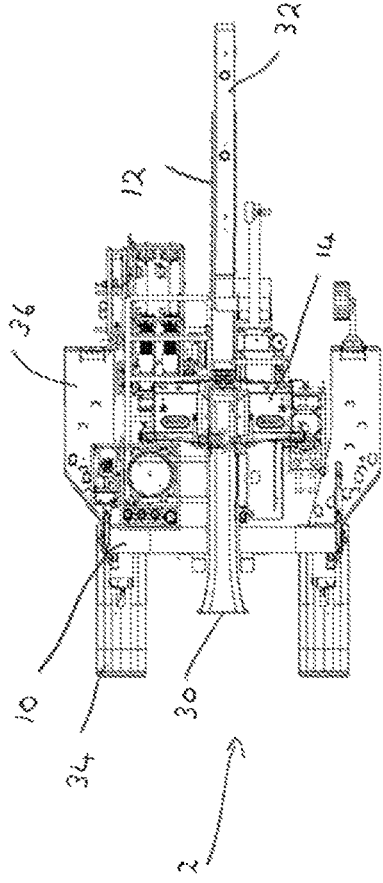
FIGS. 1A to 1C show respectively a front, top and side view of a plough of a first embodiment in a lifting mode.
Figure 1C:
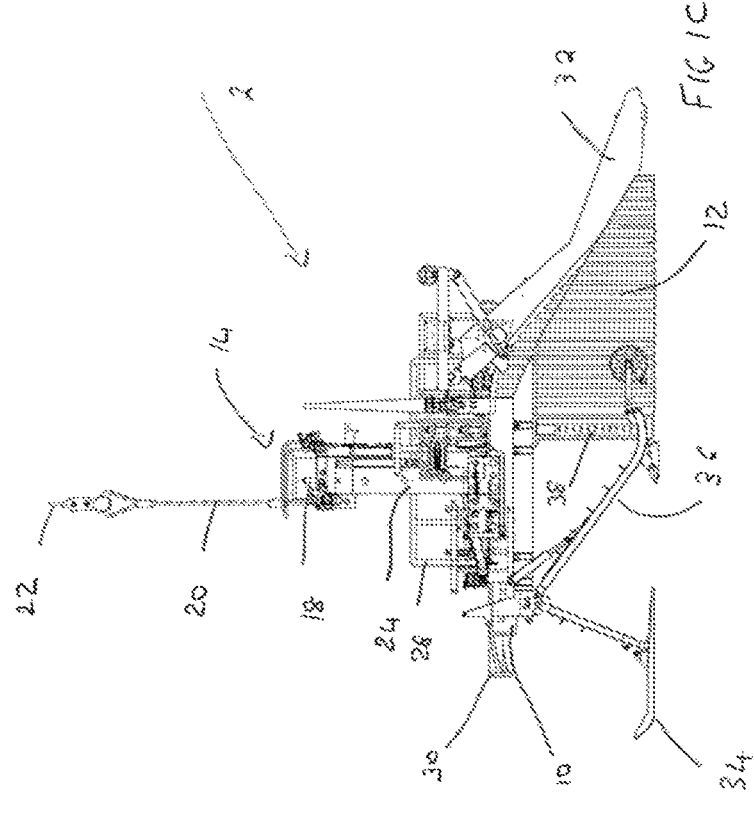
Figure 1A:
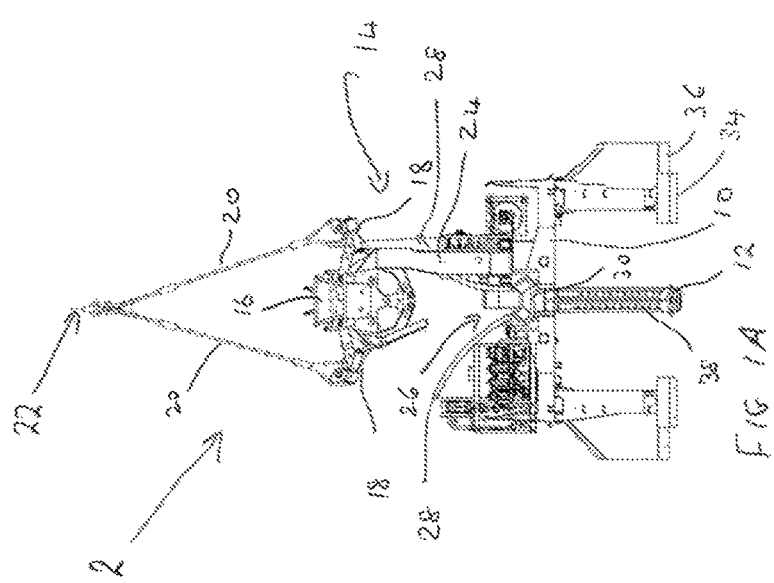
Figure 7B:
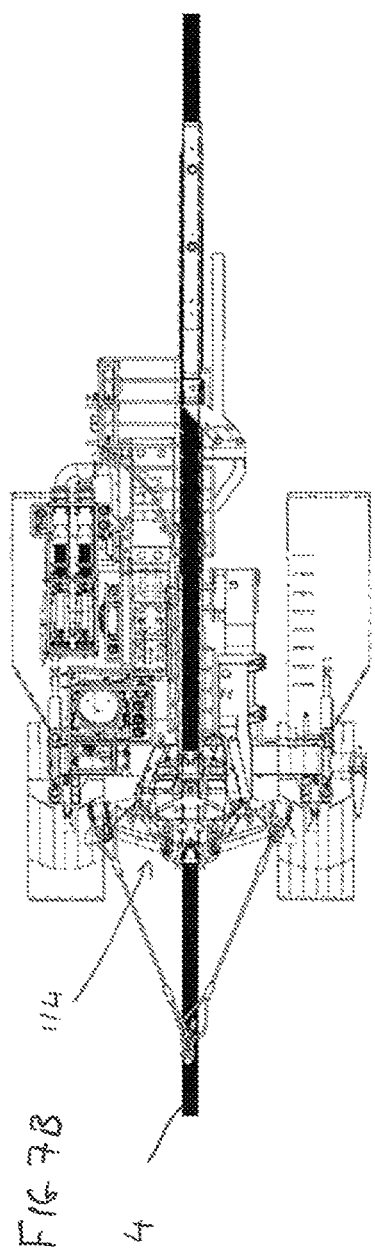
FIGS. 7A to 7C show respectively a front, top and side view of the plough of FIG. 5 in a ploughing mode with the cable loaded into the plough.
Figure 7C:
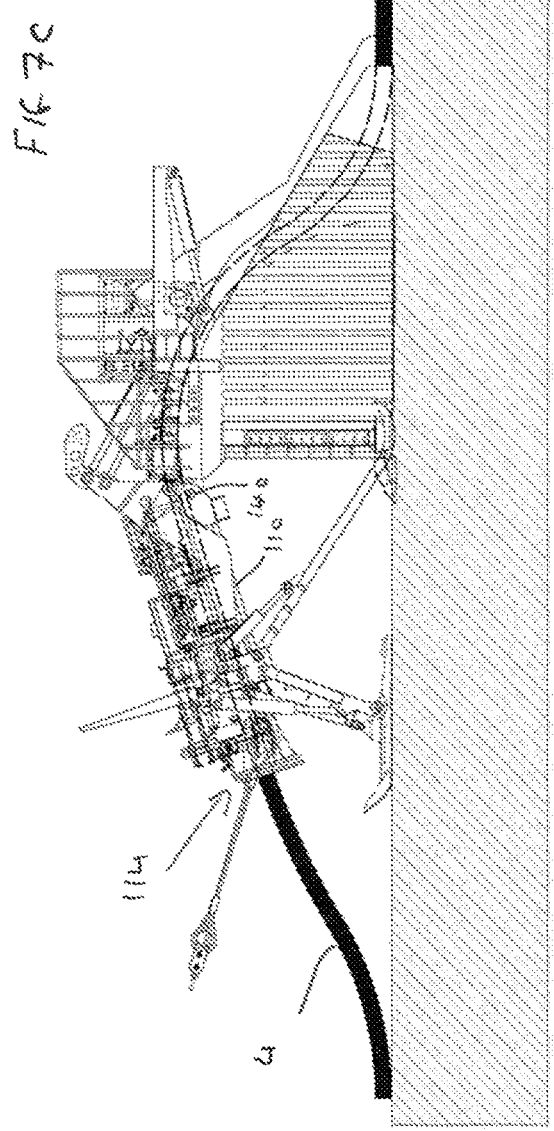
Figure 7A:
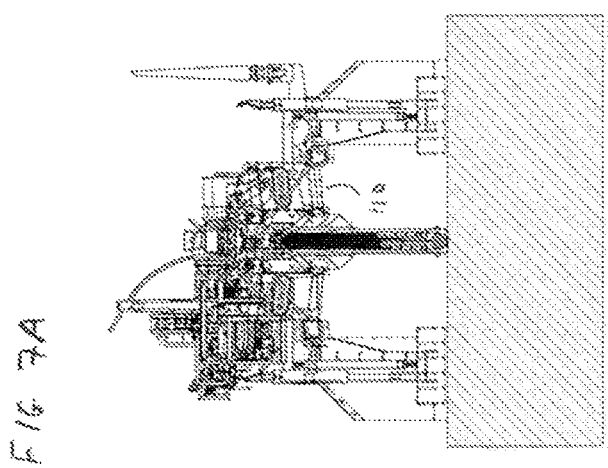
Figure 9B:
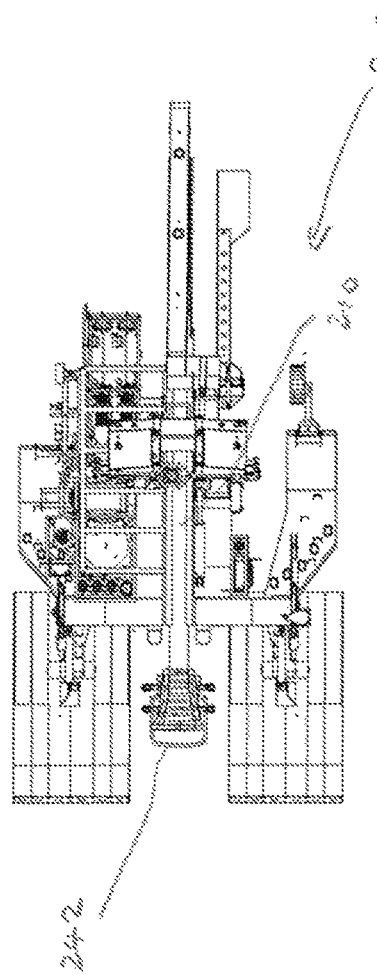
FIGS. 9A to 9C show respectively a front, top and side view of a plough of a third embodiment in a lifting mode.
Figure 9C:
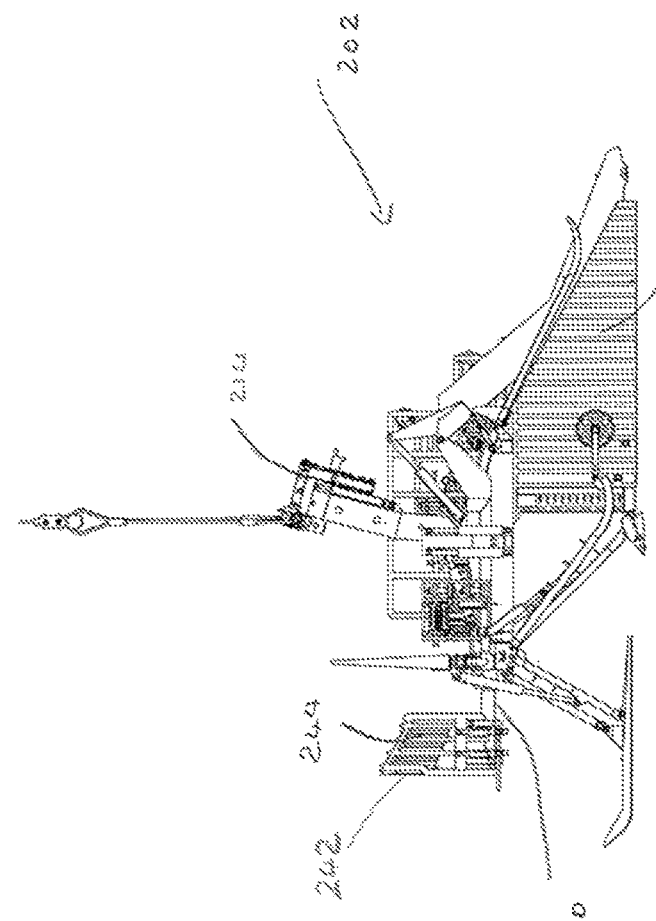
Figure 9A:
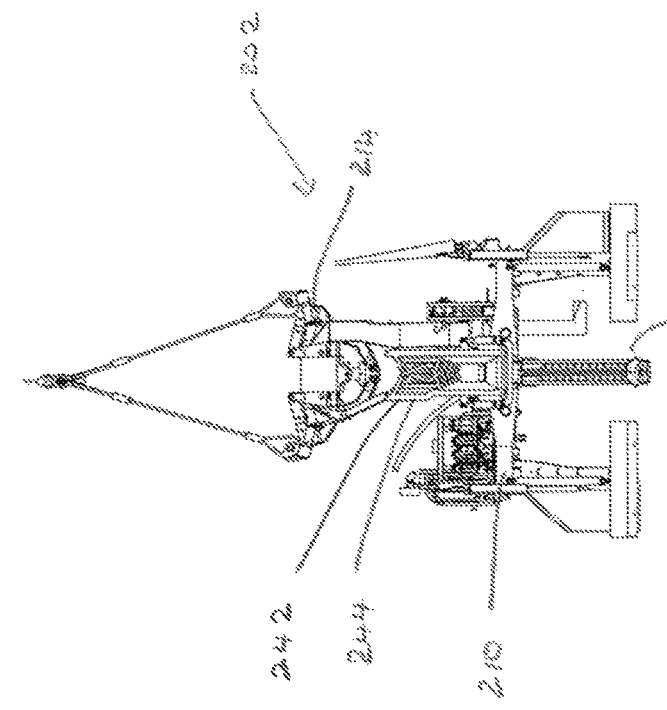
Figure 11B:
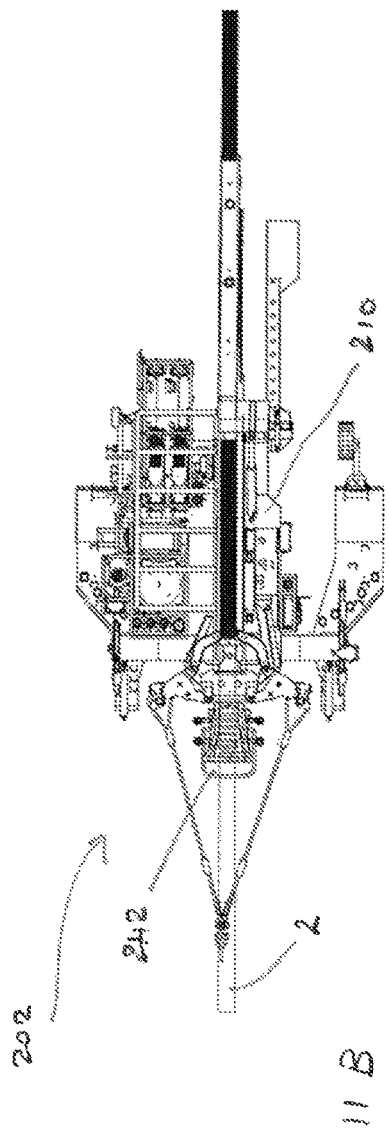
FIGS. 11A to 11C show respectively a front, top and side view of the plough of FIG. 9 in a ploughing mode with the cable loaded into the plough.
Figure 11C:
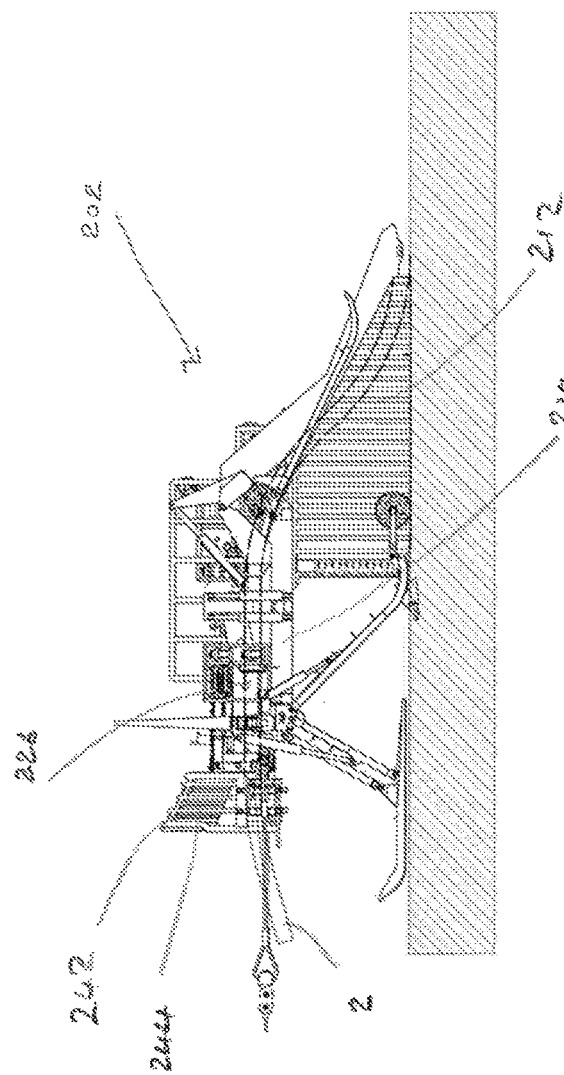
Figure 11A:
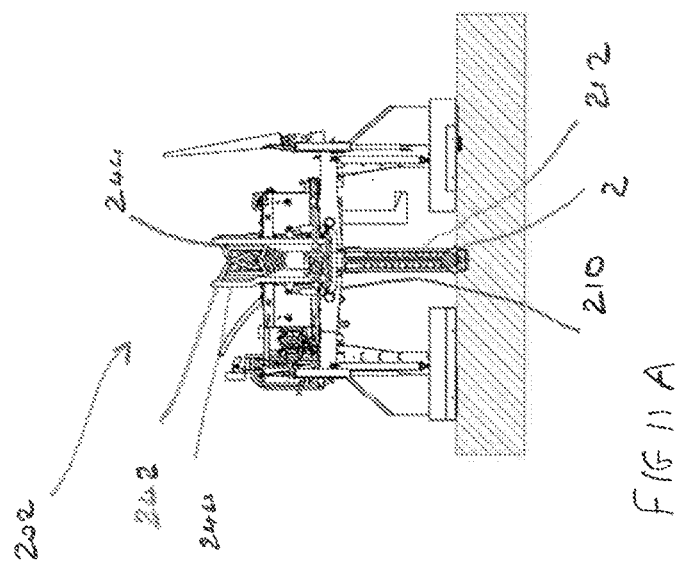
Figure 12B:
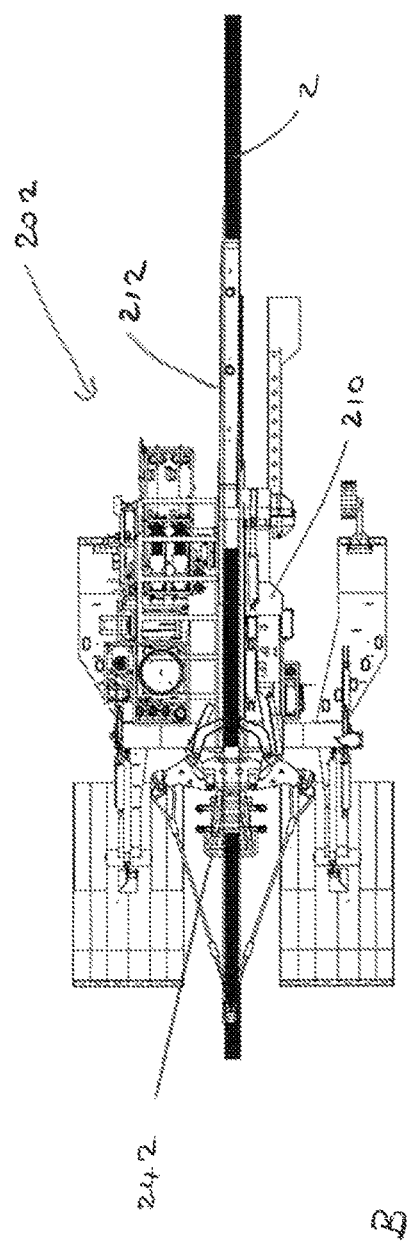
FIGS. 12A to 12C show respectively a front, top and side view of the plough of FIG. 9 in its full depth ploughing condition.
Figure 12C:
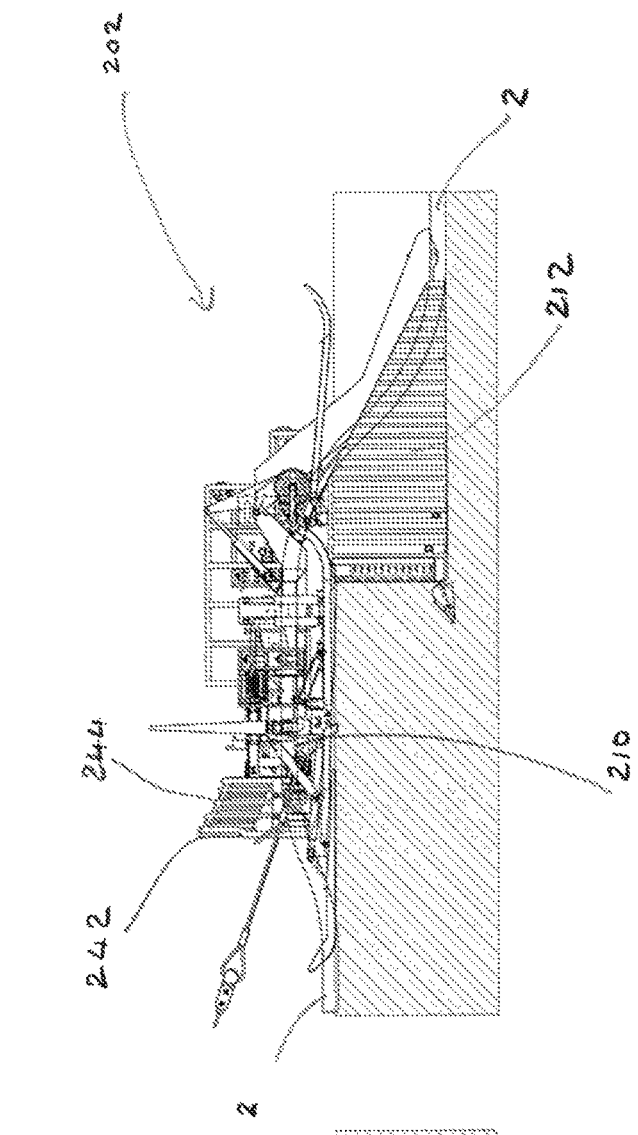
Figure 12A:
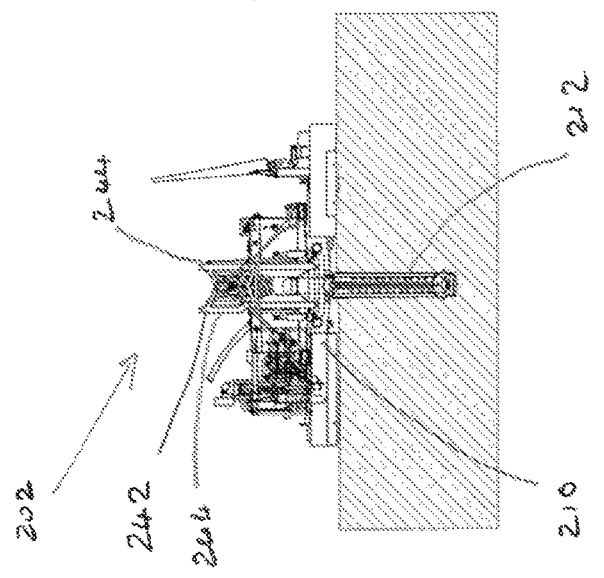
Figure 15B:
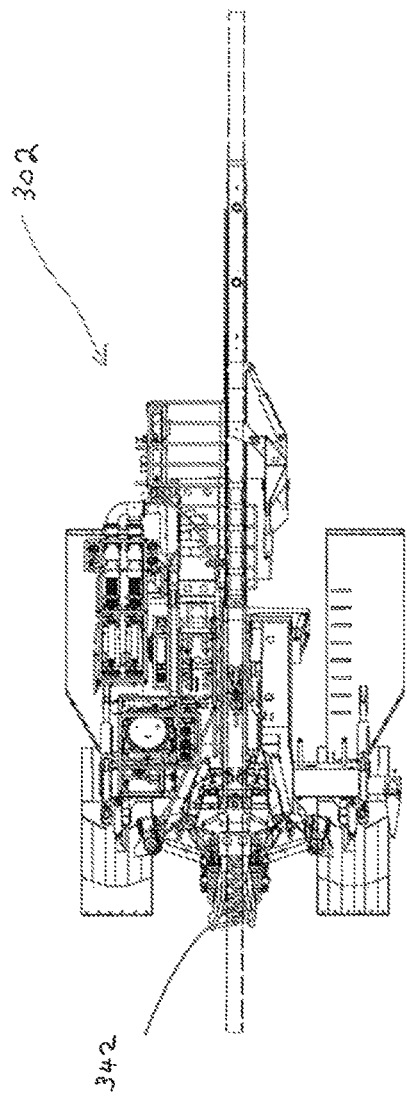
FIGS. 15A to 15C show respectively a front, top and side view of the plough of FIG. 13 in a ploughing mode with the cable loaded into the plough.
Figure 15C:
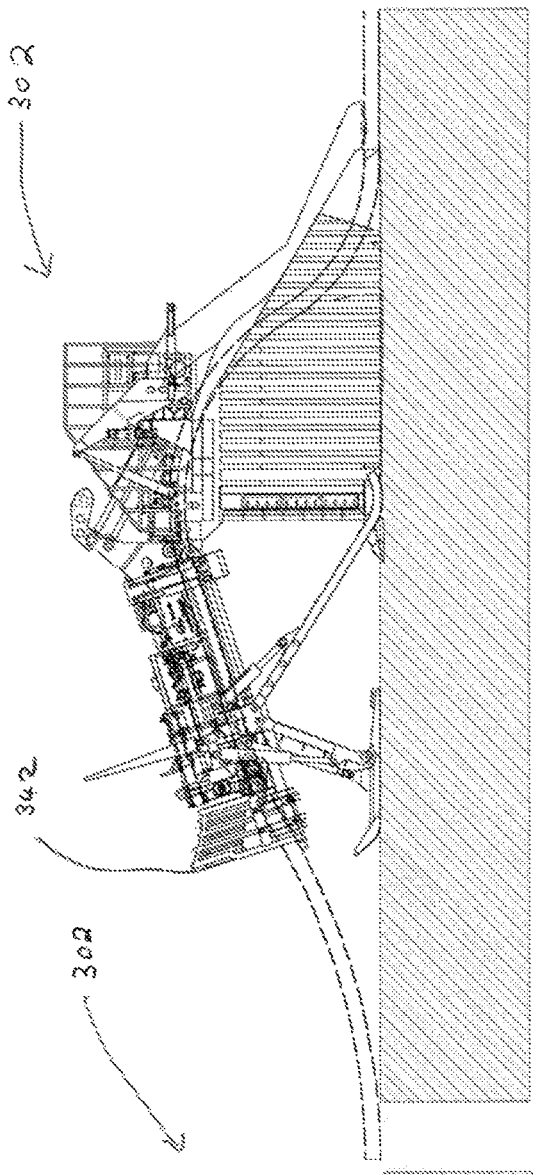
Figure 15A:
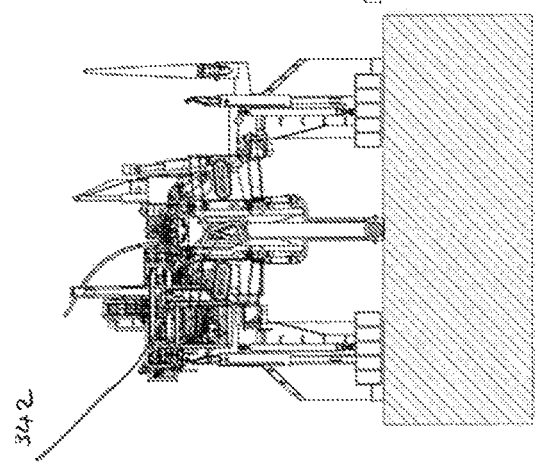
Figure 16A:
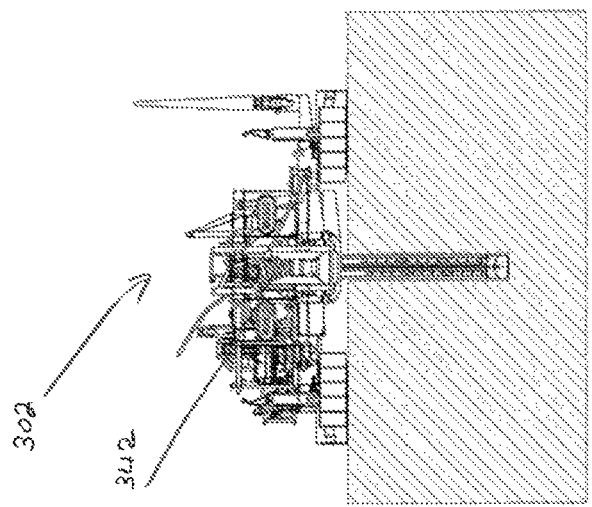
FIGS. 16A and 16B show the plough of FIG. 13 in its full depth ploughing condition.
Figure 16B:
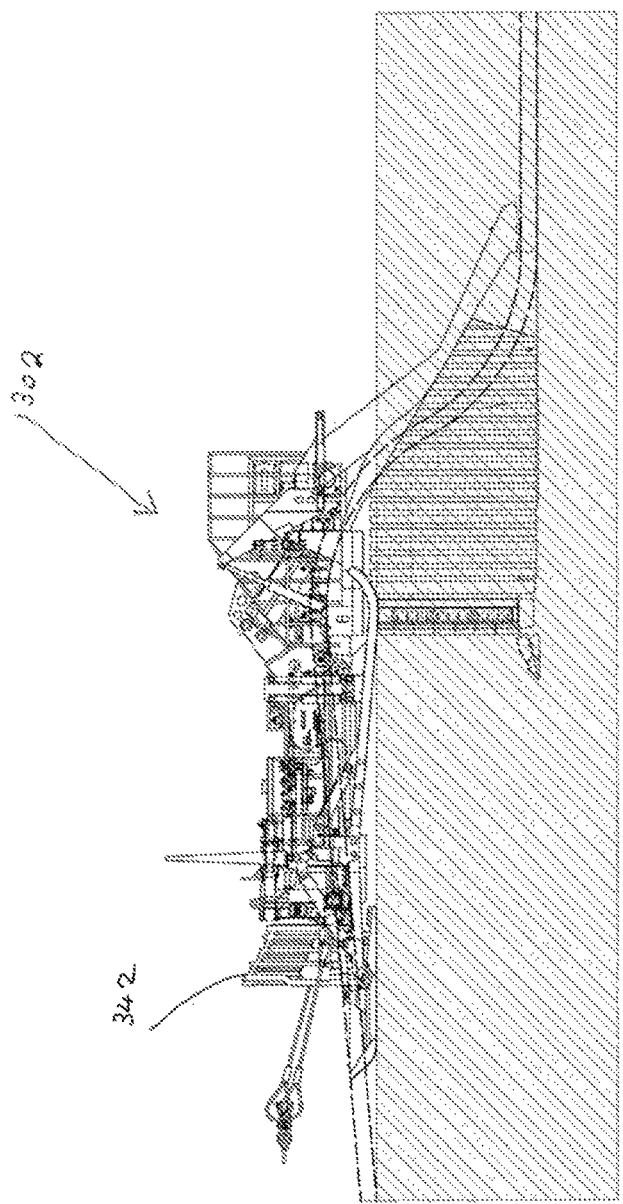

Referring to FIGS. 1A to 1C, an apparatus in the form a plough 2 for inserting an elongate object in the form of a cable 4 (FIGS. 2 to 4) into a trench 6 (FIG. 4) in the seabed 8 has a body 10 which supports trench-forming means in the form a plough share 12 for forming the trench 6 in the seabed 8. The plough 2 has attachment means in the form of a drawbar 14 having an attachment part 16, including a pair of attachment locations 18 for respective tensile members 20 forming part of a towing cable 22 for towing the plough 2 (FIGS. 3 and 4), and a support member 24 pivotably attached to the attachment part 16 at one end and to the body 10 at the other end. The attachment locations 18 are pivotable relative to the support member 24, as a result of which the effective hitch point of the towing cable 22 is adjustable by pivoting one or both of the attachment locations 18 about their respective pivot axes.

Receiving means in the form of a cable path 26 is provided in an upper part of the body 10 on an opposite side of the body 10 to the plough share 12, and guide means in the form of curved cable guides 28 is provided at the inlet to the cable path 26, to assist in guiding the cable 4 into the cable path 26 and to minimize the risk of damage to the cable 4. Bend limiting means in the form of a bellmouth 30 is provided at an inlet to the cable path 26, to prevent bending of the cable 4 around a bend radius smaller than a predetermined value.

Urging means in the form of a depressor 32 is provided rearwardly of and above the cable path 26 and is pivotally mounted to a lower part of the support member 24 so that the depressor 32 is pivotable relative to the body 10 to urge the cable 4 into a trench 6 formed in the seabed 8 by the plough share 12. The depressor 32 is also pivotable between a fourth position, in which it is located above and rearwardly of the cable path 28 to urge the cable 4 into the trench 6, and a fifth position, in which it is moved out of the way of the cable path 28 to enable the cable 4 to be located in the cable path 28 from above the plough 2.

Floor engaging means in the form of front skids 34 and rear skids 36 is pivotably mounted to the body 10 at a forward part of the body 10. The height of the plough share 12 can be adjusted by pivoting the front skids 34 relative to the body 10, and the rear skids 36 provide stability while deploying the plough 2 to and recovering the plough 2 from the seabed 8.

A row of jetting nozzles 38 is provided at a forward edge of the plough share 12, for emitting water jets to assist in breaking soil when the trench 6 is formed by the plough share 12. Water can be selectively jetted from some or all of the nozzles 38, therefore increasing the efficiency of operation of the jetting nozzles 38.

The drawbar 14 is pivotable relative to the body 10 about a first axis between a first position, in which the plough 2 is in its ploughing mode (FIGS. 3 and 4) and in which the plough 2 can be towed by the towing cable 22 to cause the plough share 12 to form a trench 6 in the seabed 8 into which the cable 4 is inserted by means of the depressor 32, and a second position (FIG. 1) in which the plough 2 is in its lifting mode and can be deployed to or recovered from the seabed 8 by means of the towing cable 22. This enables a single towing cable 22 to be used for deploying and recovery of the plough 2 to the seabed 8 and for towing the plough 2 to enable a cable 4 to be buried in the seabed 8.

The drawbar 14 is also pivotable relative to the body 10 about a second axis, generally perpendicular to the first axis, between the second position and a third position (FIG. 2), in which the cable 4 to be buried can be inserted into the cable path 26 from above the plough 2.

The operation of the plough 2 of FIGS. 1 to 4 will now be described.

Referring to FIG. 1, the plough 2 is initially deployed from a surface vessel (not shown) to the seabed 8 by means of the towing cable 22 supporting the plough 2, the plough 2 being in its lifting mode in which the drawbar 14 is located in its second position. The plough 2 is located on the seabed 8, and the front 34 and rear 36 skids support the plough 2 so that the plough share 12 does not sink into the seabed 8.

The drawbar 14 is then pivoted from the second position to the third position (FIG. 2), and because the depressor 32 is mounted to the drawbar 14, pivoting of the drawbar 14 from the second position to the third position causes pivoting of the depressor 32 from the fourth position to the fifth position to enable access the rear part of the cable path 26. The cable 4 is then introduced into the cable path 26 from above (FIG. 3), and the cable guides 28 assist in guiding the cable 4 into the cable path 26. Once the cable 4 is located in the cable path 26, the drawbar 14 is pivoted from the third position back to the second position which in turn causes the depressor 32 to be pivoted from the fifth position back to the fourth position, so that the drawbar 14 and depressor 32 are located above the cable path 26. The drawbar 14 is then pivoted relative to the body 10 into its first position, and the depth of ploughing by the plough share 12 is then selected by means of suitable selection of the orientation of the rear 36 and front 34 skids relative to the body 10.

The plough 2 is then towed by means of the towing cable 22, to cause the plough share 12 to form a trench 6 in the seabed 8, and the cable 4 passes from the cable path 26 into the trench 6 and is urged into the trench 6 by the depressor 32. Formation of the trench 6 is assisted by water jets from jetting nozzles 38 on the forward edge of the plough share 12, and the efficiency of jetting can be improved by suitable selection of predetermined jetting nozzles 38.

Referring to FIGS. 5 to 8, a plough 102 of a second embodiment is shown, in which parts common to the embodiment of FIGS. 1 to 4 are denoted by like reference numerals but increased by 100. In the plough 102 of FIGS. 5 to 8, the attachment part 116 of the drawbar 114 is pivotable relative to the support member 124 between the second position (FIG. 5) and the third position (FIG. 6) to provide access to the cable path 126 from above to enable the cable 4 to loaded into the cable path 126.

In addition, the plough body 110 is pivotable relative to the plough share 112 about pivot axis 140, which enables the height of the bellmouth 130 to be adjusted. This enables the bellmouth entry height to be minimized during shallow trenching or in transitioning to and from full depth, as a result of which the trench depth can be greater.

Referring to FIGS. 9 to 12, a plough 202 of a third embodiment is shown, in which parts common to the embodiment of FIGS. 1 to 4 are denoted by like reference numerals but increased by 200. The plough 202 of FIGS. 9 to 12 is provided with retaining means in the form of an opening bellmouth assembly 242 mounted to the body 210 of the plough 202 forward of the plough share 212. The bellmouth assembly 242 includes a pair of retaining members 244 mounted to the body 210 such that the retaining members 244 are pivotable between a released condition, in which the cable 2 can be inserted into the bellmouth assembly 242 from above the plough 202, and a retaining condition, in which the retaining members 244 retain the cable 4 in the bellmouth assembly 242 to prevent the cable 4 from being damaged by coming into contact with the drawbar 214 as the drawbar 214 is moved from its second position to its first position. In the released condition, the retaining members 244 also assist in guiding the cable 4 into the cable path 226 of the plough 202.

Referring to FIGS. 13 to 16, a plough 302 of a fourth embodiment is shown, in which parts common to the embodiment of FIGS. 5 to 8 are denoted by like reference numerals but increased by 200. The plough 302 of FIGS. 13 to 16 is provided with retaining means in the form of an opening bellmouth assembly 342, which operates in a similar manner to the bellmouth assembly 242 of FIGS. 9 to 12.

It will be appreciated by persons skilled in the art that the above embodiments have been described by way of example only and not in any limitative sense, and that various alterations and modifications are possible without departure from the scope of the disclosure as defined by the appended claims.

The invention claimed is:

1. An apparatus for inserting an elongate object into a trench in a floor in a body of water, the apparatus comprising:
    a body;
    a trench-forming device operatively coupled to the body for forming a trench in a floor of a body of water;
    an attachment device operatively coupled to the body for enabling attachment of at least one tensile member to the apparatus, wherein the attachment device is moveable relative to the trench-forming device between a first position, in which the apparatus is adapted to be towed by at least one said tensile member to move the trench-forming device relative to the floor of the body of water to form a trench therein, and a second position, in which the apparatus is adapted to be supported by at least one said tensile member to enable the apparatus to be deployed to the floor of the body of water; and
    a receiving device for receiving at least part of an elongate object to be inserted into the trench;
    wherein the attachment device is operably coupled to the body to define pivotal movement of the attachment device relative to the body about a first horizontal axis and about a second horizontal axis, wherein the attachment device is configured to pivot about the first horizontal axis vertically relative to the receiving device between the first position and the second position, and wherein the attachment device is configured to pivot about the second horizontal axis horizontally relative to the receiving device between the second position and a third position, to enable at least part of the elongate object to be received in the receiving device from a side of the apparatus remote from the trench-forming device.

2. The apparatus according to claim 1, wherein the attachment device is adapted to be attached to each of a plurality of tensile members at a respective location, and the position of at least one said location is adjustable relative to the trench-forming device.

3. The apparatus according to claim 1, wherein the attachment device further comprises:
    a sub-frame pivotably connected to the body to pivot about the second horizontal axis; and
    a support member pivotably connected to the sub-frame to pivot about the first horizontal axis;
    wherein the sub-frame and the support member are configured to pivot together relative to the body about the second horizontal axis; and
    wherein the support member is configured to pivot relative to the sub-frame about the first horizontal axis.

4. The apparatus according to claim 1, wherein:
    the first horizontal axis is located in a first horizontal plane;
    the second horizontal axis is located in a second horizontal plane;
    the first horizontal plane is parallel to and vertically offset from the second horizontal plane; and
    the first horizontal axis is oriented orthogonally relative to the second horizontal axis.

5. The apparatus according to claim 1, further comprising an urging device for urging the elongate object into the trench formed by the trench-forming device.

6. The apparatus according to claim 5, wherein the urging device is moveable between a fourth position in which the urging device is adapted to urge the elongate object into the trench formed by the trench-forming device, and a fifth position to enable at least part of the elongate object to be received in the receiving device from a side of the apparatus remote from the trench-forming device.

7. The apparatus according to claim 6, wherein movement of the attachment device from the second position to the third position causes movement of the urging device from the fourth position to the fifth position.

8. The apparatus according to claim 1, further comprising a guide device for guiding the elongate object into the receiving device.

9. The apparatus according to claim 1, wherein the trench-forming device further comprises a plurality of nozzles for emitting water jets.

10. The apparatus according to claim 9, wherein a plurality of said nozzles is selectively operable.

11. The apparatus according to claim 1, further comprising a floor engaging device for engaging the floor of the body of water.

12. The apparatus according to claim 11, wherein the floor engaging device comprises a plurality of first floor engaging members for engaging the floor of the body of water forwards of the trench-forming device.

13. The apparatus according to claim 12, wherein the floor-engaging device further comprises second floor engaging members for engaging the floor of the body of water rearwardly of the first floor engaging device.

14. The apparatus according to claim 11, wherein the position of the floor engaging device relative to the trench-forming device is adjustable.

15. The apparatus according to claim 1, further comprising a bend limiting device for limiting bending of the elongate object at an inlet to the receiving device.

16. The apparatus according to claim 15, wherein a height of an inlet to the bend limiting device is adjustable relative to the trench-forming device.

17. The apparatus according to claim 1, further comprising a retaining device mounted to the body forwards of the trench forming device and having a released condition, enabling insertion of an elongate object into the retaining device from a side of the body remote from the trench forming device, and a retaining condition, for retaining an elongate object in the retaining device.

18. The apparatus according to claim 17, wherein the retaining device is adapted to prevent the attachment device from coming into contact with an elongate object retained in said retaining device in a retaining condition thereof.

19. The apparatus according to claim 17, wherein the retaining device comprises at least one retaining member mounted to the body and moveable between released and retaining conditions thereof.

20. The apparatus according to claim 19, wherein at least one said retaining member is pivotably moveable between released and retaining conditions thereof.

21. The apparatus according to claim 1, wherein the attachment device is moveable vertically and horizontally away from the receiving device between the second position and the third position.

* * * * *